Aug. 3, 1943.　　　　C. BREBECK　　　　2,325,904
SINE BAR
Filed July 3, 1942

Inventor
Charles Brebeck

Attorneys

Patented Aug. 3, 1943

2,325,904

UNITED STATES PATENT OFFICE 2,325,904

SINE BAR

Charles Brebeck, Herkimer, N. Y.

Application July 3, 1942, Serial No. 449,698

2 Claims. (Cl. 33—174)

This invention relates to measuring instruments and particularly to devices commonly known as "sine bars" which are used in conjunction with a surface plate to establish an accurate dihedral angle between the surface plate and a plane fiducial surface on the sine bar.

The device is called a sine bar because it determines the desired angle in terms of its natural sine. Generally stated, sine bars, of the type to which the present invention relates, comprise a heavy bar of generally rectangular cross section having a longitudinal plane surface which is the fiducial surface, and two right circular cylindrical "buttons" of equal diameter, whose axes are parallel with the plane of the fiducial surface, parallel with each other, at 90° to the longitudinal axis of the fiducial surface, and equally distant therefrom.

High precision in the dimensions and location of the buttons in the stated relations is an absolute requirement. Simple forms not unduly subject to deformation upon changes of temperature are desirable. The buttons must be positively positioned under the loads to which the bar is subject in use.

Generally stated, the bar may be set precisely for angles from 0° to something less than 90°, the angular precision diminishing at an accelerated rate as the angle increases, and diminishing very rapidly as 90° is approached. One button is in contact with the surface plate and serves as a sort of rolling fulcrum for the bar. The other rests on a gage, or stack of gage blocks, proportional in height to the sine and supported by the surface plate.

One customary way of positioning the buttons is to set them in congruent right dihedral angles notched in the bar. These angles have one plane in common. This plane is parallel with the fiducial surface. The other planes which form the dihedrals are of course perpendicular to the fiducial plane and to the longitudinal axis of the bar. Such an arrangement is shown in the accompanying drawing and has the advantage that in all functional positions of the bar (above 0° of angle) the load of the bar presses the buttons into the positioning dihedrals.

As a practical matter the buttons should be permanently attached to the bar, and all prior art arrangements required a hole (or holes) through the fiducial face of the bar or holes through some portion of the face of the button which at least in some positions engaged the face plate or the sine gage (as the case might be).

It is difficult to lap a true surface in which a hole is formed because the abrasive acts more intensely around the edge of the hole and produces a low spot.

The present invention overcomes this difficulty by avoiding any interruption of the fiducial face of the bar, and by so locating tapped holes in the buttons that surrounding areas do not engage the fiducial surfaces of the positioning dihedrals.

This will become apparent upon consideration of the accompanying drawing which shows the preferred embodiment of my invention.

The surface plate is indicated at 6, and 7, 8, 9, and 11 are gage blocks selected to give a height proportional to the sine of the desired angle.

Figure 1:
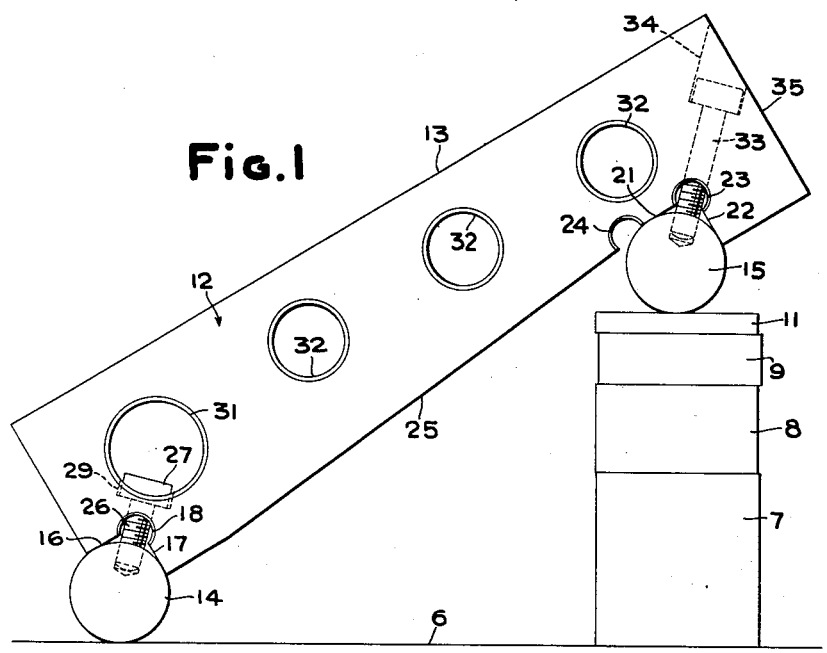
Fig. 1 is a side elevation of the improved sine bar resting on a surface plate with one button sustained by a stack of gage blocks.
Figure 2:
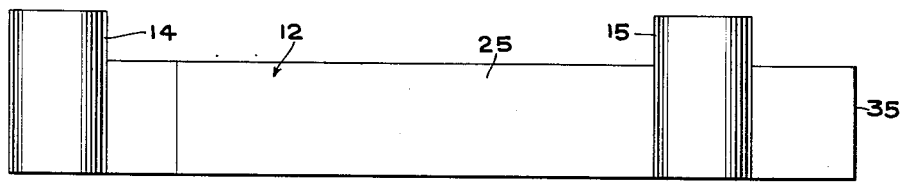
Fig. 2 is a bottom view of the sine bar.
Figure 3:
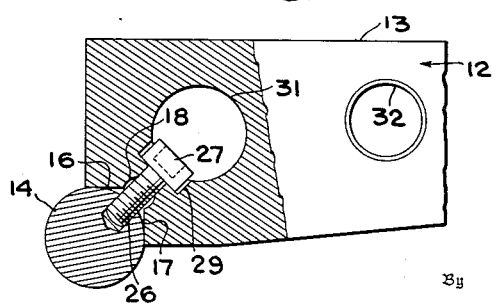
Fig. 3 is a fragmentary view with a portion sectioned to show the mode of attaching the lower button.

The body of the bar appears at 12 and has a plane fiducial surface 13. The lower button is indicated at 14 and the upper button at 15. They are right circular cylinders of equal diameters, and as indicated in Fig. 2, they are of equal lengths greater than the width of the bar 12, so that both project beyond one side face of the bar.

The button 14 is positioned in a right dihedral angle formed by the precision plane surfaces 16 and 17. A relief groove 18 is formed at their intersection to facilitate machining and lapping operations. The surfaces 16 and 17 extend slightly beyond the lines of tangency with the cylindrical buttons.

Similarly the upper button is positioned in a right dihedral angle formed by the precision plane surfaces 21 and 22. There are relief grooves 23 and 24 for the same purpose as groove 18.

The surfaces 16 and 21 lie in a common plane parallel with fiducial surface 13, and surfaces 17 and 22 are at 90° to this common plane and also to the longitudinal edges of the bar 12.

The dihedrals are congruent in the sense that they are identical and identically presented, so that if the bar is in an inclined position, the weight of the bar holds the buttons 14, 15 against the locating surfaces 16, 17 and 21, 22. The inclined lower face 25 of the bar is intended to expose button 15 sufficiently to permit central bearing on the stack of gage blocks even in the large angle settings.

The arrangement so far described has definite advantages from the standpoints of manufacture and use, but has been subject in the past to the disadvantage that the means used to attach the buttons required the formation of holes terminating in the fiducial surface 13 of the bar or in portions of the buttons 14 and 15 which, at least in some settings, engaged the surface plate 6 or the top gage 11. As explained, the presence of these holes implies impaired accuracy of the lapped precision surfaces.

Figure 4:
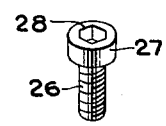
Fig. 4 is a perspective view of the attaching screw.

The difficulty is overcome by forming threaded holes in those portions of the buttons 14 and 15 which are opposite the grooves 18 and 23 and hence have no locating action. The button 14 is held by a machine screw 26 having a head 27 with a hexagonal socket 28 (see Fig. 4). The head is mounted in a countersink 29 within the cross bore 31 which is of sufficient diameter to permit removal of the screw.

Smaller bores 32 are formed in the bar 12 for lightening purposes.

The button 15 is held by a screw 33 longer than but otherwise identical with screw 26. The head of screw 33 is housed in a counterbore 34 drilled from the end surface 35 of the bar 12.

It should be observed that the axes of screws 26 and 33 bisect the dihedral angles in which their respective buttons are positioned.

The described construction completely houses the fastenings, avoids the difficulty previously encountered, and in no way impairs the form of the bar. It involves no serious difficulties in manufacture and results in greater precision.

The embodiment illustrated is intended to be exemplary and not limiting, modifications within the scope of the claims being contemplated.

I claim:

1. In a sine bar, the combination of a bar having a fiducial plane surface and a pair of seats, each seat comprising two positioning planes forming a dihedral angle; a pair of right circular cylindrical buttons each positioned by engagement with a corresponding one of said seats; and retaining screws housed in and accessible through cavities in said bar, which cavities lead from surfaces other than said fiducial surface, said screws being threaded into tapped holes in the buttons leading from portions of the cylindrical surfaces of the buttons which are wholly between the lines of contact of the buttons with said positioning planes.

2. In a sine bar, the combination of a bar having a fiducial plane surface and an aperture remote from said surface with adjacent seat at one end of the bar, said seat comprising two positioning planes forming a reentrant dihedral angle at a corner of the bar; a right circular cylindrical button positioned by engagement with said seat; a screw having a head accessible in said aperture and polygonally socketed to receive a wrench, said screw extending from the aperture into a tapped hole in the button, said hole lying wholly between the lines of contact of the button with the positioning planes; and a second button, of equal diameter with the first named button, mounted on said bar.

CHARLES BREBECK.